United States Patent [19]

Otake et al.

[11] Patent Number: 4,521,251
[45] Date of Patent: Jun. 4, 1985

[54] LOW-MELTING GLASS PASTE AND CELLULOSE NITRATE THEREFOR

[75] Inventors: Etsuo Otake, Yokohama; Mamoru Kimura, Himeji; Hiromu Yokota, Himeji; Tetuo Kanematu, Himeji, all of Japan

[73] Assignee: Daicel Chemical Industries, Ltd., Osaka, Japan

[21] Appl. No.: 492,083

[22] Filed: May 6, 1983

[30] Foreign Application Priority Data

May 17, 1982 [JP] Japan .................................. 57-82832

[51] Int. Cl.³ ........................... C08L 1/08; C08L 1/18
[52] U.S. Cl. ..................................... 106/183; 106/187; 106/188; 106/189; 106/193 R; 106/195; 501/15

[58] Field of Search ............... 106/193, 188, 195, 189, 106/183, 187; 536/35, 41; 501/15

[56] References Cited

U.S. PATENT DOCUMENTS 3,534,018 10/1970 Brissaud et al. ....................... 536/35
4,273,585 6/1981 Krohn et al. ............................ 501/15
4,293,439 10/1981 Corbett et al. ....................... 106/195

Primary Examiner—Theodore Morris
Attorney, Agent, or Firm—Flynn, Thiel, Boutell and Tanis

[57] ABSTRACT

A cellulose nitrate having a degree of nitration of from 12.2% to 14.1% in terms of the nitrogen content and a degree of polymerization of from 100 to 1,000 is suitable to prepare a low-melting glass paste.

3 Claims, 2 Drawing Figures

LOW-MELTING GLASS PASTE AND CELLULOSE NITRATE THEREFOR

This invention relates to a low-melting glass paste for use in bonding or coating and to a high-nitrogen cellulose nitrate for use in the preparation of the low-melting glass paste.

In the production of packaging components for an integrated circuit or electron tube components, bonding between glasses, between glass and ceramic or between ceramics or coating of a glass coating layer on the surface of glass or ceramic must be carried out. In such a case, a glass frit composition in a paste form is used as the bonding or coating material.

In the case of the components for an integrated circuit, for example, a paste consisting principally of a low-melting glass frit is coated on a plurality of ceramic substrates and is then calcined to form a calcined glass layer. After circuit elements such as a silicon wafer, lead wires and the like are fitted, the temperature is raised so that the calcined glass is completely fused to effect hermetic sealing. This glass frit is glass powder consisting of fine particles of up to $150\mu$ and uses a binder or tackifier prepared by dissolving ethylcellulose, hydroxypropylcellulose, cellulose nitrate, acrylic resin or their mixture in an appropriate solvent in the paste form. The glass frit paste is coated on the substrate by coating, silk screen printing or the like.

In order for the packaging components of an integrated circuit to fully exhibit their required characteristics, it is necessary that the binder is completely decomposed by calcination and residues such as carbon or ash are not left behind. In other words, after the circuit elements are incorporated, the temperature is raised and the glass is fused to effect sealing. If any gas is present in this case, voids would be left behind and air-tightness becomes insufficient or a reducing atmosphere would be formed locally so that the properties of the elements are changed to cause degradation of the insulating properties of the package and the like and defective products will result.

If the sealing glass is of the conventional type which has a calcining temperature of at least 500° C., ordinary organic polymer materials suitable as the binder are decomposed almost completely, without causing any serious problem, in particular.

As the number of electronic components to be packaged becomes greater and as they are required to have higher characteristics in recent years, however, a high sintering temperature that would somehow affect the elements themselves, the substrates and their relative arrangements must be avoided and hence, a sealing glass frit having lower calcining and fusing temperatures has been developed. In addition, heating for fusing is now effected in an inert gas atmosphere in place of the oxygen atmosphere or air in order to prevent the oxidation of the elements. For these reasons, thermal decomposition is not effected sufficiently with conventional binders and no suitable binder for a low melting glass frit has been found as yet.

A low-melting glass that has been developed and put into practical application consists of $SiO_2$, $PbO$, $B_2O_3$ and the like and has a softening temperature (calcining temperature) of from 350° to 450° C. and a fusing temperature of from about 400° to about 550° C.

Cellulose nitrate is known as a material that burns even in an atmosphere with poor oxygen supply, and has been used in the past as a binder for glass bonding, as described previously. However, a conventional cellulose nitrate is of a so-called "coating grade" and its degree of nitration is about 11.5% (in terms of the nitrogen content). Though it is thermally decomposed even at 400° C., it tends to provide a combustion residue at this temperature if it is heated in the presence of glass frit or in a nitrogen atmosphere.

As a result of intensive studies, the inventors of the present invention have found that a high-nitrogen cellulose nitrate having a degree of nitration of from 12.2% to 14.1% in terms of the nitrogen content satisfies the requirements described above and is suitable as a binder for a low-melting glass frit. The present invention is completed on the basis of this finding.

If the cellulose nitrate has a high degree of nitration of at least 12.2% in terms of the nitrogen content, it is completely decomposed under the condition of heat-treatment for sealing packages of an integrated circuit using the heretofore known low-melting glass. If the degree of nitration is too high, on the other hand, mixing dispersability and bondability between the cellulose nitrate and glass frit tend to drop and the cellulose nitrate is no longer suitable as the binder. For this reason, a suitable degree of nitration is up to 14.1%.

From the aspects of coatability and printability of the paste, a suitable viscosity is in the order of several tens of thousands of centipoises. In view of the combustion residue, it is effective to use a cellulose nitrate having a relatively high molecular weight.

If the molecular weight is too high, however, the quantity of the cellulose nitrate required to obtain the same paste viscosity becomes small so that the printability and the binding property of the glass paste layer decrease. It is thus found that a suitable range exists for the degree of polymerisation and a cellulose nitrate having a degree of polymerisation of from 100 to 1,000 is suitable for the object of the present invention.

The weight loss of the high-nitrogen cellulose nitrate of the type described above is at least 95% at 300° C. under a thermal decomposition condition of a temperature rise of 10° C./min in a nitrogen atmosphere and is almost 100% in most cases as will be illustrated in the examples below.

To produce the low-melting glass paste of the present invention, the cellulose nitrate having the degree of nitration and degree of polymerisation within the respective ranges described above is dissolved in a solvent and is mixed with a low-melting glass frit. A medium-boiling solvent having a boiling point in the range of 100° to 250° C. is suitable as the solvent. Examples of the solvent are isoamyl acetate, n-butyl carbinol, isobutyl carbinol, cellosolve, diacetone alcohol, and the like. The moisture content of the glass paste is preferably up to 0.5%. If water is present, part of it crystallizes and remains even after calcination, thus causing troubles after sealing. To prevent this, it is preferred to use a solvent having a low moisture content and to use the cellulose nitrate in a state wetted by alcohol but not by water, in a dried state, in the form of chip or in the form of a dope in an organic solvent.

Thus, the present invention relates to a high-nitrogen cellulose nitrate for use in preparing a low-melting glass frit, which has a degree of nitration of from 12.2 to 14.1% in terms of the nitrogen content and a degree of polymerisation of from 100 to 1,000, and also to a low-melting glass paste comprising the high-nitrogen cellulose nitrate, a low-melting glass frit and a solvent.

The glass frit paste of the present invention scarcely generates any combustion residue at a calcining temperature of 300° C. Accordingly, the glass frit paste using the high-nitrogen cellulose nitrate of the present invention can be used advantageously for hermetic sealing of a variety of semiconductor devices, bonding between a panel and a funnel of a cathode ray tube, coating of an electroluminescence and various insulation, bonding, protective coating applications of electronic components beside the sealing application of the integrated circuit package described above.

Now the present invention will be described with reference to examples thereof.

EXAMPLES 1 TO 4 AND COMPARATIVE EXAMPLES 1 TO 3

Four kinds of high-nitrogen cellulose nitrates prepared from refined cotton linter as the raw material, a commercially axailable coating-grade cellulose nitrate, methylcellulose and ethylcellulose were dried to a moisture content of up to 1% and were used as samples for thermogravimetric analysis. Details of the samples are as follows.

| Example | Sample | Degree of nitration (nitrogen content: %) | Degree of polymerisation |
|---|---|---|---|
| Example 1 | high-nitrogen cellulose nitrate | 14.06 | 115 |
| Example 2 | high-nitrogen cellulose nitrate | 13.53 | 320 |
| Example 3 | high-nitrogen cellulose nitrate | 12.60 | 340 |
| Example 4 | high-nitrogen cellulose nitrate | 14.05 | 950 |
| Comp. Ex. 1 | coating-grade cellulose nitrate | 11.83 | 110 |
| Comp. Ex. 2 | methylcellulose 60SH-4000* | | |
| Comp. Ex. 3 | ethylcellulose** | | |

*a product of Shin-Etsu Chem. Co., degree of substitution (SD) - 1.86–1.90, viscosity of 2% aqueous solution 3500–3600 cps
**a product of Hercules Inc., degree of substitution (SD) = 2.46–2.58, viscosity of 1% aqueous solution 45 cps The thermogravimetric analysis was carried out using a thermoanalytical instrument produced by Rigaku Denki K.K. in a nitrogen stream at a rate of temperature rise of 10° C./min so as to measure the weight loss due to thermal decomposition.

Figure 1:
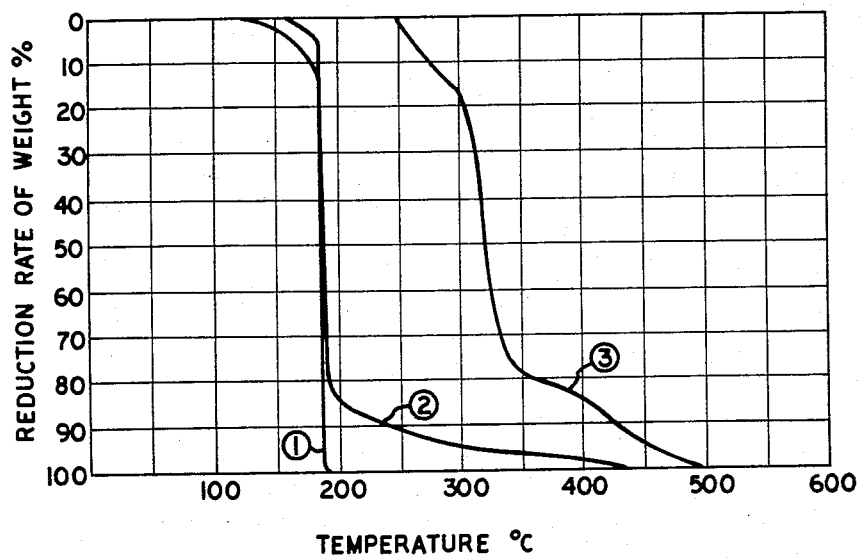
FIGS. 1 and 2 are diagrams showing the temperature vs. weight loss curves of Examples of the present invention and those of Comparative Examples.

Table 1 illustrates the weight loss at 300° C. and at 350° C. as well as a thermal decomposition termination temperature (at which the weight loss reached substantially 100%). FIG. 1 shows a temperature vs. weight loss curve of each sample of Example 1 and Comparative Examples 1 and 2. In FIG. 1, symbols ①, ② and ③ represent curves of the samples of Example 1 and Comparative Examples 1 and 2, respectively, and measurement was conducted in a nitrogen stream at a rate of temperature rise of 10° C./min.

It was confirmed from the results of measurement that the thermal decomposition of all the samples of Examples were completed at 300° C. or below without leaving any residue behind, whereas the thermal decomposition of the coating-grade cellulose nitrate was insufficient at the calcining temperature of the low-melting glass. In the case of the binders other than the cellulose nitrate, greater quantities of residues were formed.

EXAMPLES 5 TO 9 AND COMPARATIVE EXAMPLES 4 AND 5

The same cellulose nitrates as those used in Examples 1 through 4 and in Comparative Example 1 was dissolved in 9 times by volume of acetone. A commercially available low-melting sealing glass frit (a product of Nippon Electric Glass Co., LS-0803, 150 mesh pass, softening point 350° C., sealing temperature 400° C.) was added thereto in multiples listed below and the mixture was stirred over a hot bath to evaporate acetone. The resulting solid mixture was milled in an agate mortar to use as samples for the thermogravimetric analysis under the same condition as in Examples 1 through 4. The details of the samples are as follows.

| Example | Sample | |
|---|---|---|
| Example 5 | cellulose nitrate of Ex. 1: | glass frit = 1:15 |
| Example 6 | cellulose nitrate of Ex. 1: | glass frit = 1:5 |
| Example 7 | cellulose nitrate of Ex. 4: | glass frit = 1:50 |
| Example 8 | cellulose nitrate of Ex. 2: | glass frit = 1:5 |
| Example 9 | cellulose nitrate of Ex. 3: | glass frit = 1:5 |
| Comp. Ex. 4 | cellulose nitrate of Comp. Ex. 1: | glass frit = 1:15 |
| Comp. Ex. 5 | cellulose nitrate of Comp. Ex. 1: | glass frit = 1:5 |

The results of the analysis are also tabulated in Table 1. However, only the weight loss of the cellulose nitrate was measured while the glass frit was assumed to suffer no weight loss.

Figure 2:
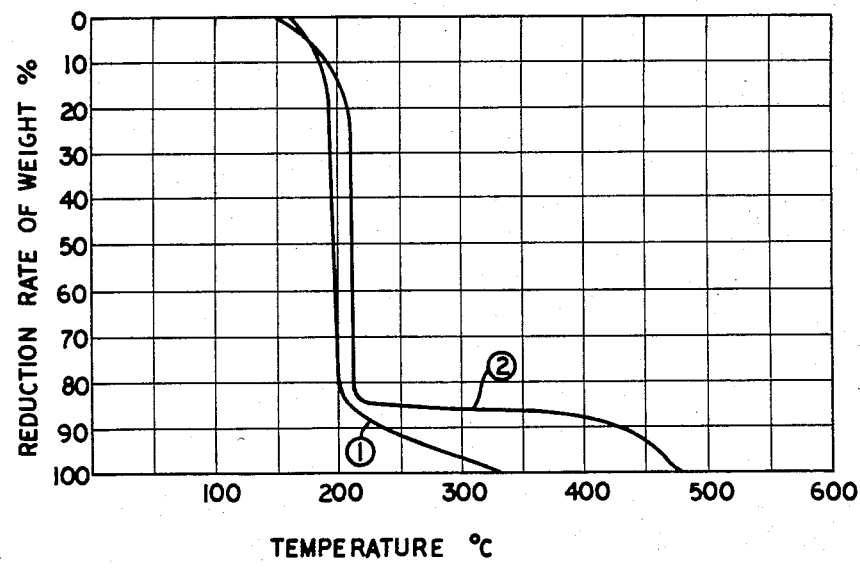

FIG. 2 shows temperature vs. weight loss curves of the sample of Example 5 (curve ①) and that of Comparative Example 4 (curve ②). The temperature necessary for the thermal decomposition was found to be somewhat higher in the presence of glass frit than when the cellulose nitrate alone was thermally decomposed, but in Examples of the present invention the thermal decomposition was effected substantially completely at the glass softening point (350° C.) which was the calcining temperature. It was found, on the other hand, that large quantities of residues remained at this temperature in the case of Comparative Examples.

Since the thermal decomposition of the cellulose nitrate is vigorous at around 200° C. in the case of Examples of the present invention, it is believed preferable to raise the temperature slowly near this temperature in the calcination.

TABLE 1

| Ex. No. | Weight loss (%) 300° C. | 350° C. | Decomposition termination temp. (°C.) |
|---|---|---|---|
| Ex. | | | |
| 1 | 100 | 100 | 190 |
| 2 | 100 | 100 | 200 |
| 3 | 100 | 100 | 300 |
| 4 | 100 | 100 | 190 |
| 5 | 97 | 100 | 330 |
| 6 | 99 | 100 | 320 |
| 7 | 97 | 100 | 340 |
| 8 | 98 | 100 | 330 |
| 9 | 95 | 98 | 390 |
| Comp. Ex. | | | |

TABLE 1-continued

| Ex. No. | Weight loss (%) 300° C. | Weight loss (%) 350° C. | Decomposition termination temp. (°C.) |
| --- | --- | --- | --- |
| 1 | 94.5 | 96.0 | 440 |
| 2 | 16.5 | 78.0 | 500 |
| 3 | 16.5 | 89.0 | 500 |
| 4 | 86 | 86.5 | 480 |
| 5 | 90 | 94 | 460 |

The embodiments of the invention in which an exclusive property or privilege is claimed are defined as follows:

1. A glass paste, comprising: glass frit having a softening point of up to 450° C., said glass frit being suspended in a binder, said binder consisting essentially of a solution of high-nitrogen cellulose nitrate having a nitrogen content of from 12.2 to 14.1% and a degree of polymerization in the range of from 100 to 1,000, said high-nitrogen cellulose nitrate being dissolved in an organic solvent having a boiling point in the range of from 100° C. to 250° C.

2. A glass paste as claimed in claim 1 in which said high-nitrogen cellulose nitrate has the property that the weight loss thereof is at least 95%, at 300° C., when said cellulose nitrate is heated at a rate of temperature increase of 10° C./min, in a nitrogen atmosphere.

3. A glass paste as claimed in claim 1 in which said solvent is selected from the group consisting of isoamyl acetate, n-butyl carbinol, isobutyl carbinol, cellosolve and diacetone alcohol.

* * * * *